(12) United States Patent
Moessinger et al.

(10) Patent No.: US 11,036,295 B2
(45) Date of Patent: *Jun. 15, 2021

(54) ELECTROSTATIC SLIDE CLUTCH

(71) Applicant: Microsoft Technology Licensing, LLC, Redmond, WA (US)

(72) Inventors: Holger Moessinger, Darmstadt (DE); Siyuan Ma, Redmond, WA (US); James David Holbery, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/620,672

(22) Filed: Jun. 12, 2017

(65) Prior Publication Data

US 2018/0143687 A1 May 24, 2018

Related U.S. Application Data

(60) Provisional application No. 62/426,163, filed on Nov. 23, 2016.

(51) Int. Cl.
*G09G 5/00* (2006.01)
*G06F 3/01* (2006.01)
(52) U.S. Cl.
CPC .............. *G06F 3/016* (2013.01); *G06F 3/014* (2013.01)
(58) Field of Classification Search
None
See application file for complete search history.

(56) References Cited

U.S. PATENT DOCUMENTS

| | | |
|---|---|---|
| 2,897,425 A | 7/1959 | Waring et al. |
| 4,753,442 A | 6/1988 | Bland |
| 4,987,332 A | 1/1991 | Yamamoto et al. |
| 5,173,834 A | 12/1992 | Sogoh |
| 5,184,319 A | 2/1993 | Kramer |
| 5,429,140 A | 7/1995 | Burdea et al. |
| 5,516,249 A | 5/1996 | Brimhall |
| 5,631,861 A | 5/1997 | Kramer |

(Continued)

FOREIGN PATENT DOCUMENTS

| | | |
|---|---|---|
| CN | 100998527 A | 7/2007 |
| CN | 106726027 A | 5/2017 |

(Continued)

OTHER PUBLICATIONS

Stuart Diller, Demonstration: Electroadhesive Clutch, Jul. 7, 2016, https://www.youtube.com/watch?v=CufIVK76fPQ (Year: 2016).*

(Continued)

*Primary Examiner* — Kirk W Hermann
(74) *Attorney, Agent, or Firm* — Alleman Hall Creasman & Tuttle LLP

(57) ABSTRACT

Described herein is an electrostatic slide clutch comprising a first electrode, a second electrode oriented parallel to first electrode, an electrically insulating structure disposed on the first electrode on a face of the first electrode opposing the second electrode, and a controller electrically coupled to the first electrode and to the second electrode and configured to apply a variable voltage between the first and second electrodes, to influence a normal force between the first and second electrodes.

20 Claims, 5 Drawing Sheets

(56) References Cited

U.S. PATENT DOCUMENTS

| | | | |
|---|---|---|---|
| 6,128,004 A | 10/2000 | McDowall et al. | |
| 6,413,229 B1 | 7/2002 | Kramer et al. | |
| 6,524,681 B1 * | 2/2003 | Seitz | D06N 7/00 |
| | | | 104/18 |
| 6,790,308 B2 | 9/2004 | Murphy et al. | |
| 6,809,462 B2 | 10/2004 | Pelrine et al. | |
| 6,966,882 B2 | 11/2005 | Horst | |
| 7,046,151 B2 | 5/2006 | Dundon | |
| 7,056,297 B2 | 6/2006 | Dohno et al. | |
| 7,166,953 B2 | 1/2007 | Heim et al. | |
| 7,250,935 B2 | 7/2007 | Kubota et al. | |
| 7,390,157 B2 | 6/2008 | Kramer | |
| 7,407,895 B2 | 8/2008 | Kunitake et al. | |
| 7,481,782 B2 | 1/2009 | Scott et al. | |
| 7,537,573 B2 | 5/2009 | Horst | |
| 7,545,349 B2 | 6/2009 | Yamada | |
| 7,551,419 B2 | 6/2009 | Pelrine et al. | |
| 7,920,124 B2 | 4/2011 | Tokita et al. | |
| 8,029,414 B2 | 10/2011 | Ingvast et al. | |
| 8,049,772 B2 | 11/2011 | Lipton et al. | |
| 8,058,853 B2 | 11/2011 | Murota | |
| 8,138,895 B2 | 3/2012 | Kato et al. | |
| 8,160,743 B2 | 4/2012 | Birkenbach et al. | |
| 8,164,232 B2 | 4/2012 | Kornbluh et al. | |
| 8,255,079 B2 | 8/2012 | Linn et al. | |
| 8,325,458 B2 | 12/2012 | Prahlad et al. | |
| 8,330,590 B2 | 12/2012 | Poupyrev et al. | |
| 8,362,882 B2 | 1/2013 | Heubel et al. | |
| 8,665,241 B2 | 3/2014 | Heubel et al. | |
| 8,833,826 B2 | 9/2014 | Garcia et al. | |
| 8,860,336 B2 | 10/2014 | Anderson et al. | |
| 8,861,171 B2 | 10/2014 | Prahlad et al. | |
| 8,882,285 B2 | 11/2014 | Walsh | |
| 8,964,351 B2 | 2/2015 | Horinouchi | |
| 8,998,831 B2 | 4/2015 | Sankai | |
| 9,093,926 B2 | 7/2015 | Prahlad et al. | |
| 9,120,220 B2 | 9/2015 | Bergelin et al. | |
| 9,148,074 B2 | 9/2015 | Boughtwood | |
| 9,170,288 B2 | 10/2015 | O'Brien et al. | |
| 9,180,866 B2 | 11/2015 | Helmer et al. | |
| 9,266,233 B2 | 2/2016 | Kornbluh et al. | |
| 9,301,563 B2 | 4/2016 | Hardy et al. | |
| 9,375,382 B2 | 6/2016 | Fausti et al. | |
| 9,401,668 B2 | 7/2016 | Prahlad et al. | |
| 9,403,056 B2 | 8/2016 | Weinberg et al. | |
| 9,403,272 B2 | 8/2016 | Kornbluh et al. | |
| 9,417,693 B2 | 8/2016 | Seth | |
| 9,427,864 B2 | 8/2016 | Kornbluh et al. | |
| 9,529,433 B2 | 12/2016 | Shankar et al. | |
| 9,606,624 B2 | 3/2017 | Cruz-Hernandez et al. | |
| 9,710,060 B2 | 7/2017 | McMillen et al. | |
| 9,846,482 B2 | 12/2017 | Seth | |
| 9,851,082 B2 | 12/2017 | Thompson et al. | |
| 9,921,609 B2 | 3/2018 | Levesque et al. | |
| 9,931,235 B2 | 4/2018 | Summer et al. | |
| 9,939,468 B1 | 4/2018 | Dyszel | |
| 9,950,422 B2 | 4/2018 | Kornbluh et al. | |
| 9,983,672 B2 | 5/2018 | Olien et al. | |
| 10,012,276 B2 | 7/2018 | Eckerle et al. | |
| 10,013,062 B1 | 7/2018 | Corson et al. | |
| 10,025,387 B2 | 7/2018 | Keller et al. | |
| 10,055,019 B2 | 8/2018 | Beran | |
| 10,055,022 B2 | 8/2018 | Appleyard et al. | |
| 10,082,872 B2 | 9/2018 | Cruz-Hernandez et al. | |
| 10,082,875 B1 | 9/2018 | Kim et al. | |
| 10,104,923 B2 | 10/2018 | Howland et al. | |
| 10,105,839 B2 | 10/2018 | Kornbluh et al. | |
| 10,137,362 B2 | 11/2018 | Buchanan et al. | |
| 10,197,459 B2 | 2/2019 | Keller et al. | |
| 10,228,396 B2 | 3/2019 | Gisby et al. | |
| 10,248,200 B2 | 4/2019 | Cohen et al. | |
| 10,275,025 B2 | 4/2019 | Black et al. | |
| 10,281,982 B2 | 5/2019 | Keller et al. | |
| 10,317,998 B2 | 6/2019 | Holbery et al. | |
| 10,355,624 B2 | 7/2019 | Majidi et al. | |
| 10,366,583 B2 | 7/2019 | Khoshkava et al. | |
| 10,372,213 B2 | 8/2019 | Keller et al. | |
| 10,381,143 B2 | 8/2019 | Khoshkava et al. | |
| 10,423,227 B2 | 9/2019 | Gu | |
| 10,427,293 B2 | 10/2019 | Asbeck et al. | |
| 10,433,367 B2 | 10/2019 | Pratt et al. | |
| 10,437,335 B2 | 10/2019 | Daniels | |
| 10,466,784 B2 | 11/2019 | Cohen et al. | |
| 10,474,236 B1 | 11/2019 | Stewart et al. | |
| 10,514,759 B2 | 12/2019 | Taylor et al. | |
| 10,521,947 B2 | 12/2019 | Yokokawa | |
| 10,528,138 B2 | 1/2020 | Keller et al. | |
| 10,543,110 B2 | 1/2020 | Piercy et al. | |
| 10,561,565 B2 | 2/2020 | John et al. | |
| 10,564,722 B2 | 2/2020 | Keller et al. | |
| 10,572,011 B2 | 2/2020 | Holbery | |
| 10,572,014 B2 | 2/2020 | Keller et al. | |
| 10,595,618 B2 | 3/2020 | Wang et al. | |
| 10,603,190 B2 | 3/2020 | Mateus Dias Quinaz | |
| 10,627,783 B2 | 4/2020 | Rothkopf et al. | |
| 10,663,016 B2 | 5/2020 | Schmitz et al. | |
| 10,860,102 B2 | 12/2020 | Remaley et al. | |
| 2002/0130673 A1 | 9/2002 | Pelrine et al. | |
| 2003/0125781 A1 | 7/2003 | Dohno et al. | |
| 2004/0084261 A1 * | 5/2004 | Burgoon | F16D 65/0006 |
| | | | 188/218 XL |
| 2004/0102723 A1 | 5/2004 | Horst | |
| 2004/0174337 A1 | 9/2004 | Kubota et al. | |
| 2005/0012485 A1 | 1/2005 | Dundon | |
| 2006/0004307 A1 | 1/2006 | Horst | |
| 2006/0094989 A1 | 5/2006 | Scott et al. | |
| 2006/0115348 A1 | 6/2006 | Kramer | |
| 2006/0152098 A1 | 7/2006 | Horst et al. | |
| 2006/0261516 A1 * | 11/2006 | Kunitake | C23C 18/1212 |
| | | | 264/259 |
| 2007/0016265 A1 | 1/2007 | Davoodi et al. | |
| 2007/0129846 A1 | 6/2007 | Birkenbach et al. | |
| 2007/0195482 A1 | 8/2007 | Muka et al. | |
| 2008/0059131 A1 | 3/2008 | Tokita et al. | |
| 2008/0089002 A1 | 4/2008 | Pelrine et al. | |
| 2008/0153590 A1 | 6/2008 | Ombrellaro et al. | |
| 2009/0102620 A1 | 4/2009 | Kato et al. | |
| 2010/0007240 A1 * | 1/2010 | Kornbluh | B64C 3/48 |
| | | | 310/309 |
| 2010/0041521 A1 | 2/2010 | Ingvast et al. | |
| 2010/0045251 A1 | 2/2010 | Murota | |
| 2010/0085169 A1 | 4/2010 | Poupyrev et al. | |
| 2010/0141407 A1 | 6/2010 | Heubel et al. | |
| 2010/0318006 A1 | 12/2010 | Horst | |
| 2011/0071664 A1 | 3/2011 | Linn et al. | |
| 2011/0101823 A1 | 5/2011 | Anderson et al. | |
| 2011/0187637 A1 | 8/2011 | Nichols | |
| 2011/0193362 A1 | 8/2011 | Prahlad et al. | |
| 2011/0234414 A1 | 9/2011 | Ojeda et al. | |
| 2012/0029399 A1 | 2/2012 | Sankai | |
| 2012/0053498 A1 | 3/2012 | Horst | |
| 2012/0086366 A1 | 4/2012 | Anderson et al. | |
| 2012/0109025 A1 | 5/2012 | Weinberg et al. | |
| 2012/0154974 A1 | 6/2012 | Bhatnagar et al. | |
| 2012/0182720 A1 | 7/2012 | Walsh | |
| 2013/0010398 A1 * | 1/2013 | Prahlad | H02N 13/00 |
| | | | 361/234 |
| 2013/0072829 A1 | 3/2013 | Fausti et al. | |
| 2013/0155020 A1 | 6/2013 | Heubel et al. | |
| 2013/0226350 A1 | 8/2013 | Bergelin et al. | |
| 2013/0242455 A1 | 9/2013 | Prahlad et al. | |
| 2013/0285577 A1 | 10/2013 | O'brien et al. | |
| 2013/0294875 A1 | 11/2013 | Prahlad et al. | |
| 2013/0330162 A1 | 12/2013 | Horinouchi | |
| 2014/0035306 A1 | 2/2014 | Garcia et al. | |
| 2014/0162598 A1 | 6/2014 | Villa-Real | |
| 2014/0215684 A1 | 8/2014 | Hardy et al. | |
| 2014/0277739 A1 * | 9/2014 | Kornbluh | B25J 9/0006 |
| | | | 700/260 |
| 2014/0352161 A1 | 12/2014 | Ranieri et al. | |
| 2015/0123647 A1 | 5/2015 | Gisby et al. | |
| 2015/0132974 A1 | 5/2015 | Kapella | |
| 2015/0266180 A1 | 9/2015 | Kornbluh et al. | |
| 2015/0266181 A1 | 9/2015 | Kornbluh et al. | |

(56) References Cited

U.S. PATENT DOCUMENTS

| | | | |
|---|---|---|---|
| 2015/0321339 A1 | 11/2015 | Asbeck et al. | |
| 2016/0004308 A1* | 1/2016 | Cruz-Hernandez | G06F 3/016 345/173 |
| 2016/0025459 A1 | 1/2016 | Kwint et al. | |
| 2016/0030835 A1 | 2/2016 | Argiro | |
| 2016/0070347 A1 | 3/2016 | Mcmillen et al. | |
| 2016/0101516 A1 | 4/2016 | Kornbluh et al. | |
| 2016/0101517 A1* | 4/2016 | Kornbluh | B25J 9/0006 482/78 |
| 2016/0115707 A1 | 4/2016 | Schneider et al. | |
| 2016/0120734 A1 | 5/2016 | Ishikawa et al. | |
| 2016/0124548 A1* | 5/2016 | Cherif | G06F 3/044 345/174 |
| 2016/0162022 A1 | 6/2016 | Seth | |
| 2016/0187973 A1 | 6/2016 | Shankar et al. | |
| 2016/0187977 A1 | 6/2016 | Cruz-hernandez et al. | |
| 2016/0209448 A1 | 7/2016 | Currie et al. | |
| 2016/0213548 A1 | 7/2016 | John et al. | |
| 2016/0224115 A1 | 8/2016 | Olien et al. | |
| 2016/0259417 A1 | 9/2016 | Gu | |
| 2016/0278948 A1 | 9/2016 | Piercy et al. | |
| 2016/0313630 A1 | 10/2016 | Elmohtaseb | |
| 2016/0342207 A1 | 11/2016 | Beran | |
| 2016/0361179 A1 | 12/2016 | Mateus Dias Quinaz | |
| 2016/0363887 A1 | 12/2016 | Nodera et al. | |
| 2016/0363997 A1 | 12/2016 | Black et al. | |
| 2016/0378071 A1 | 12/2016 | Rothkopf | |
| 2017/0014111 A1 | 1/2017 | Hulseman et al. | |
| 2017/0038839 A1 | 2/2017 | Seth | |
| 2017/0055596 A1 | 3/2017 | Colby et al. | |
| 2017/0061753 A1 | 3/2017 | Khoshkava et al. | |
| 2017/0131769 A1 | 5/2017 | Keller et al. | |
| 2017/0131770 A1 | 5/2017 | Keller et al. | |
| 2017/0160807 A1 | 6/2017 | Keller et al. | |
| 2017/0165567 A1* | 6/2017 | Walters | A63F 13/285 |
| 2017/0168375 A1 | 6/2017 | Lajoie | |
| 2017/0168565 A1 | 6/2017 | Cohen et al. | |
| 2017/0176267 A1 | 6/2017 | Keller et al. | |
| 2017/0185152 A1 | 6/2017 | Keller et al. | |
| 2017/0210302 A1 | 7/2017 | Le | |
| 2017/0212589 A1 | 7/2017 | Domenikos et al. | |
| 2017/0222576 A1* | 8/2017 | Majidi | H02N 13/00 |
| 2017/0235213 A1 | 8/2017 | Clearman | |
| 2017/0248272 A1 | 8/2017 | Ullrich et al. | |
| 2017/0273374 A1 | 9/2017 | Howland et al. | |
| 2017/0319950 A1 | 11/2017 | Buchanan et al. | |
| 2017/0371416 A1 | 12/2017 | Zeitler | |
| 2018/0039302 A1 | 2/2018 | Levesque et al. | |
| 2018/0055713 A1 | 3/2018 | Cromie et al. | |
| 2018/0056104 A1 | 3/2018 | Cromie et al. | |
| 2018/0077976 A1 | 3/2018 | Keller et al. | |
| 2018/0081436 A1 | 3/2018 | Keller et al. | |
| 2018/0081437 A1 | 3/2018 | Taylor et al. | |
| 2018/0081439 A1 | 3/2018 | Daniels | |
| 2018/0098583 A1 | 4/2018 | Keller et al. | |
| 2018/0107277 A1 | 4/2018 | Keller et al. | |
| 2018/0140441 A1 | 5/2018 | Poirters | |
| 2018/0143687 A1 | 5/2018 | Moessinger et al. | |
| 2018/0151281 A1 | 5/2018 | Khoshkava et al. | |
| 2018/0153722 A1 | 6/2018 | Cromie et al. | |
| 2018/0196515 A1 | 7/2018 | Appleyard et al. | |
| 2018/0258562 A1 | 9/2018 | Fukuhara | |
| 2018/0260052 A1 | 9/2018 | Karagozler | |
| 2018/0311570 A1 | 11/2018 | Buchanan et al. | |
| 2018/0314334 A1 | 11/2018 | Appleyard et al. | |
| 2018/0319020 A1 | 11/2018 | Prahlad et al. | |
| 2018/0324896 A1 | 11/2018 | Pratt et al. | |
| 2018/0335841 A1 | 11/2018 | Rubin et al. | |
| 2018/0361566 A1 | 12/2018 | Kombluh et al. | |
| 2018/0368559 A1 | 12/2018 | Wang et al. | |
| 2018/0373331 A1 | 12/2018 | Holbery et al. | |
| 2019/0004602 A1 | 1/2019 | Holbery | |
| 2019/0101981 A1 | 4/2019 | Elias et al. | |
| 2019/0101983 A1 | 4/2019 | Cohen et al. | |
| 2019/0102927 A1 | 4/2019 | Yokokawa | |
| 2019/0176320 A1 | 6/2019 | Smith et al. | |
| 2019/0204921 A1 | 7/2019 | Goupil et al. | |
| 2019/0209086 A1 | 7/2019 | Huang et al. | |
| 2019/0247050 A1 | 8/2019 | Goldsmith | |
| 2019/0282131 A1 | 9/2019 | Chang et al. | |
| 2019/0283247 A1 | 9/2019 | Chang et al. | |
| 2019/0339773 A1 | 11/2019 | Holbery et al. | |
| 2019/0343707 A1 | 11/2019 | Riener et al. | |
| 2019/0346938 A1 | 11/2019 | Wang et al. | |
| 2019/0352808 A1 | 11/2019 | Yoon et al. | |
| 2020/0012344 A1 | 1/2020 | McMillen et al. | |
| 2020/0012345 A1 | 1/2020 | Wang et al. | |
| 2020/0016363 A1 | 1/2020 | Macri et al. | |
| 2020/0029635 A1 | 1/2020 | Kiemele et al. | |
| 2020/0081532 A1 | 3/2020 | Yoon et al. | |
| 2020/0081533 A1 | 3/2020 | Holbery et al. | |
| 2020/0170750 A1 | 6/2020 | Coppersmith | |
| 2020/0371590 A1 | 11/2020 | Remaley et al. | |
| 2202/0037159 | 11/2020 | Remaley et al. | |

FOREIGN PATENT DOCUMENTS

| | | | | |
|---|---|---|---|---|
| DE | 102015113827 A1 | 2/2017 | | |
| EP | 0782843 A2 | 7/1997 | | |
| EP | 0981423 A2 | 3/2000 | | |
| EP | 3343325 A1 | 7/2018 | | |
| FI | 127459 B | 6/2018 | | |
| FR | 3040803 A1 | 3/2017 | | |
| GB | 2488760 A | 9/2012 | | |
| JP | H06126661 A | 5/1994 | | |
| JP | 2005227111 A | * | 8/2005 | |
| WO | 2005089176 A2 | 9/2005 | | |
| WO | WO-2005089176 A2 | * | 9/2005 | B64C 3/48 |
| WO | 2011116357 A2 | 9/2011 | | |
| WO | 2016012480 A2 | 1/2016 | | |
| WO | 2016057963 A1 | 4/2016 | | |
| WO | 2016070078 A1 | 5/2016 | | |
| WO | 2017199035 A1 | 11/2017 | | |
| WO | 2018031476 A1 | 2/2018 | | |
| WO | 2018059737 A1 | 4/2018 | | |
| WO | 2018122106 A1 | 7/2018 | | |

OTHER PUBLICATIONS

"International Search Report and Written Opinion Issued in PCT Application No. PCT/US2019/038833", dated Nov. 5, 2019, 21 Pages.

"Dupont LuxPrint 8153", Retrieved From: https://www.dupont.com/content/dam/dupont/products-and-services/electronic-and-electrical-materials/documents/prodlib/8153.pdf, Oct. 2009, 3 Pages.

"Plexus—High Performance VR/AR Gloves", Retrieved from: https://web.archive.org/web/20190306150539/http:/plexus.im/, Mar. 6, 2019, 2 Pages.

"Non Final Office Action Issued in U.S. Appl. No. 15/968,677", dated Apr. 29, 2019, 44 Pages.

Bianchi, Matteo, "A Fabric-Based Approach for Wearable Haptics", in Journal of Electronics, vol. 5, Issue 3, Jul. 26, 2017, 14 Pages.

Cassar, et al., "A Force Feedback Glove Based on Magnetorheological Fluid: Preliminary Design Issues", in Proceedings of 15th IEEE Mediterranean Electrotechnical Conference, May 2010, 7 Pages.

Delph, et al., "Modeling and Design of a Tendon Actuated Soft Robotic Exoskeletonfor Hemiparetic Upper Limb Rehabilitation", in Proceedings of 37th Annual International Conference of the IEEE Engineering in Medicine and Biology Society (EMBC), Aug. 25, 2015, pp. 3889-3892.

Gabardi, et al., "A New Wearable Fingertip Haptic Interface for the Rendering of Virtual Shapes and Surface Features", in Proceedings of the IEEE Haptics Symposium, Apr. 8, 2016, pp. 140-146.

"International Search Report and Written Opinion Issued in PCT Application No. PCT/US19/028425", dated Jul. 3, 2019, 11 Pages.

Schorr, Samuel, "Wearable Skin Deformation Feedback for Force Sensory Substitution in Virtual Reality", Retrieved From: https://web.archive.org/web/20141114233415/https:/www.samuelschorr.com/research.html, Nov. 14, 2014, 8 Pages.

(56) References Cited

OTHER PUBLICATIONS

Shintake, et al., "Versatile Soft Grippers with Intrinsic Electroadhesion Based Onmultifunctional Polymer Actuators", in Journal of Advanced Materials, vol. 28, Issue 2, Jan. 2016, pp. 1-28.
Xiloyannis, et al., "Preliminary Design and Control of a Soft Exosuit for Assisting Elbow Movements and Hand Grasping in Activities of daily living", in Journal of Rehabilitation and Assistive Technologies Engineering, vol. 4, Jan. 1, 2017, 15 Pages.
Ye, et al., "Force-Sensing Glove System for Measurement of Hand Forces during Motorbike Riding", Retrieved from: http://journals.sagepub.com/doi/full/10.1155/2015/545643, Nov. 29, 2015, pp. 1-9.
Azambuja, Enaie, "Electroadhesive clutch substitutes conventional ones in robotics", Retrieved from: https://www.electronicspecifier.com/robotics/electroadhesive-clutch-substitutes-conventional-ones-in-robotics, Jul. 8, 2016, 5 Pages.
Holbery, et al., "Electrostatic Slide Clutch with Bidirectional Drive Circuit", Application as Filed in U.S. Appl. No. 15/968,677, Filed Date: May 1, 2018, 36 Pages.
Pessina, Laure-Anne, "Ultra-light gloves let users "touch" virtual objects", Retrieved from: https://actu.epfl.ch/news/ultra-light-gloves-let-users-touch-virtual-objects/, Oct. 15, 2018, 3 Pages.
Bolzmacher, et al., "Polymer Based Actuators for Virtual Reality Devices", in Proceedings of SPIE, vol. 5385, Jul. 27, 2004, pp. 281-289.
Frediani, et al., "Wearable Wireless Tactile Display for Virtual Interactions with Soft Bodies", in Journal of Bioengineering and Biotechnology, vol. 2, Sep. 2014, 7 pages.
Zhang, et al., "Dielectric Elastomer Actuators for a Portable Force Feedback Device", in Proceedings of the 14th International Symposium on Haptic Interfaces for Virtual Environment and Teleoperator Systems, Mar. 25, 2006, 8 pages.
Bauer, et al., "Electromechanical characterization and measurement protocol for dielectric elastomer actuators", in Proceedings of SPIE, vol. 6168, Mar. 20, 2006, 2 pages.
Kumar, et al., "MuJoCo Haptix: A Virtual Reality System for Hand Manipulation", in Proceedings of IEEE 15th International Conference on Humanoid Robots (Humanoids), Nov. 3, 2015, 7 pages.
Cohen, et al., "Virtual reality robotic telesurgery simulations using Memica haptic system", in proceedings of the SPIE Smart Structures Conference, vol. 4329, Mar. 5, 2001, 7 pages.
Choi, et al., "Wolverine: A Wearable Haptic Interface for Grasping in VR", in Proceedings of the 29th Annual Symposium on User Interface Software and Technology, Oct. 16, 2016, pp. 117-119.
Ying, et al., "Visualization Bio-Mimetic Model of Muscular Drive", in Proceedings of IEEE International Symposium on Industrial Electronics, Jun. 4, 2007, 3 pages.
Diller, et al., "A lightweight, low-power electroadhesive clutch and spring for exoskeleton actuation", in Proceedings of IEEE International Conference on Robotics and Automation, May 16, 2016, pp. 682-689.
Heo, et al, "Current Hand Exoskeleton Technologies for Rehabilitation and Assistive Engineering", in International Journal of Precision Engineering and Manufacturing, vol. 13, Issue 5, May 1, 2012, pp. 807-824.
Diller, et al. "Exoskeleton walking with a lightweight, low-power electroadhesive clutch and spring". Dynamic Walking, Holly, Michigan, USA, Jun. 4-7, 2016.
Gallego, Jelor, "New Super-Light Exoskeleton Created to Enhance the Human Body", retrieved at <<http://www.hotey.com/@futurism_unofficial/external/10779655/new-super-light-exoskeleton-created-to-enhance-the-human-body.html>>, Jul. 20, 2016.
Lai, Richard, "Dexmo exoskeleton glove lets you touch and feel in VR", retrieved at <<https://www.engadget.com/2016/08/24/dexmo-exoskeleton-glove-force-feedback/>>, Aug. 24, 2016.
"International Search Report and Written Opinion Issued in PCT Application No. PCT/US2017/062119", dated Mar. 12, 2018, 12 Pages.
"Non Final Office Action Issued in U.S. Appl. No. 16/123,682", dated Oct. 15, 2019, 32 Pages.
"Final Office Action Issued in U.S. Appl. No. 15/968,677", dated Oct. 21, 2019, 26 Pages.
"International Search Report and Written Opinion Issued in PCT Application No. PCT/US2019/038075", dated Sep. 9, 2019, 12 Pages.
"International Search Report and Written Opinion Issued in PCT Application No. PCT/US2019/038847", dated Oct. 2, 2019, 11 Pages.
"Non Final Office Action Issued in U.S. Appl. No. 15/968,677", dated Apr. 9, 2020, 30 Pages.
"Non Final Office Action Issued in U.S. Appl. No. 16/046,708", dated Mar. 2, 2020, 9 Pages.
"Non Final Office Action Issued in U.S. Appl. No. 16/124,834", dated Mar. 23, 2020, 15 Pages.
"Notice of Allowance Issued in U.S. Appl. No. 16/406,202", dated Apr. 15, 2020, 8 Pages.
"Non Final Office Action Issued in U.S. Appl. No. 16/422,801", dated Mar. 11, 2020, 14 Pages.
"Non Final Office Action Issued in U.S. Appl. No. 16/123,682", dated Apr. 24, 2020, 15 Pages.
"Final Office Action Issued in U.S. Appl. No. 16/422,801", dated Jun. 22, 2020, 23 Pages.
"Non Final Office Action Issued in U.S. Appl. No. 16/422,611", dated Jul. 9, 2020, 7 Pages.
"Final Office Action Issued in U.S. Appl. No. 16/046,708", dated Aug. 3, 2020, 11 Pages.
"Notice of Allowance Issued in U.S. Appl. No. 16/123,682", dated Aug. 4, 2020, 11 Pages.
"International Search Report and Written Opinion Issued in PCT Application No. PCT/US20/026953", dated Jul. 6, 2020, 12 Pages.
Hinchet, et al., "DextrES: Wearable Haptic Feedback for Grasping in VR via a Thin Form-Factor Electrostatic Brake", In Proceedings of the 31st Annual ACM Symposium on user Interface Software and Technology, Oct. 14, 2018, pp. 901-912.
"International Search Report and Written Opinion issued in PCT Application No. PCT/US2020/028379", dated Jul. 31, 2020, 10 Pages.
"Final Office Action Issued in U.S. Appl. No. 16/124,834", dated Sep. 28, 2020, 21 Pages.
"Non Final Office Action Issued in U.S. Appl. No. 16/422,801", dated Nov. 18, 2020, 17 Pages.
"International Search Report and the Written Opinion Issued in PCT Application No. PCT/US2020/028381", dated Jul. 14, 2020, 9 Pages.

* cited by examiner

ELECTROSTATIC SLIDE CLUTCH

CROSS REFERENCE TO RELATED APPLICATIONS

This application claims priority to U.S. Provisional Patent Application No. 62/426,163 filed Nov. 23, 2016, the entirety of which is hereby incorporated herein by reference.

BACKGROUND

A state-of-the-art virtual reality (VR) or mixed reality (MR) holographic system may immerse a user in a convincing alternative reality, where visual and auditory aspects of virtual objects are represented in a true-to-life manner.

SUMMARY

Examples are disclosed that relate to electrostatic slide clutches that may be used for tactile feedback in mixed reality and virtual reality settings. One example provides an electrostatic slide clutch comprising a first electrode, a second electrode oriented parallel to the first electrode, an electrically insulating structure, and a controller. The electrically insulating structure comprises a heterogeneous surface structure and is disposed on the first electrode on a face of the first electrode opposing the second electrode. The controller is electrically coupled to the first electrode and to the second electrode and configured to apply a variable voltage between the first and second electrodes to influence a normal force between the first and second electrodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

While mixed reality and virtual reality systems may provide an immersive visual and auditory experience, such systems may not provide a satisfying tactile experience for the user, in which virtual objects feel like the real objects they represent. Thus, examples are disclosed that relate to electrostatic slide clutches that may be used for tactile feedback in mixed reality and virtual reality settings.

Figure 1:
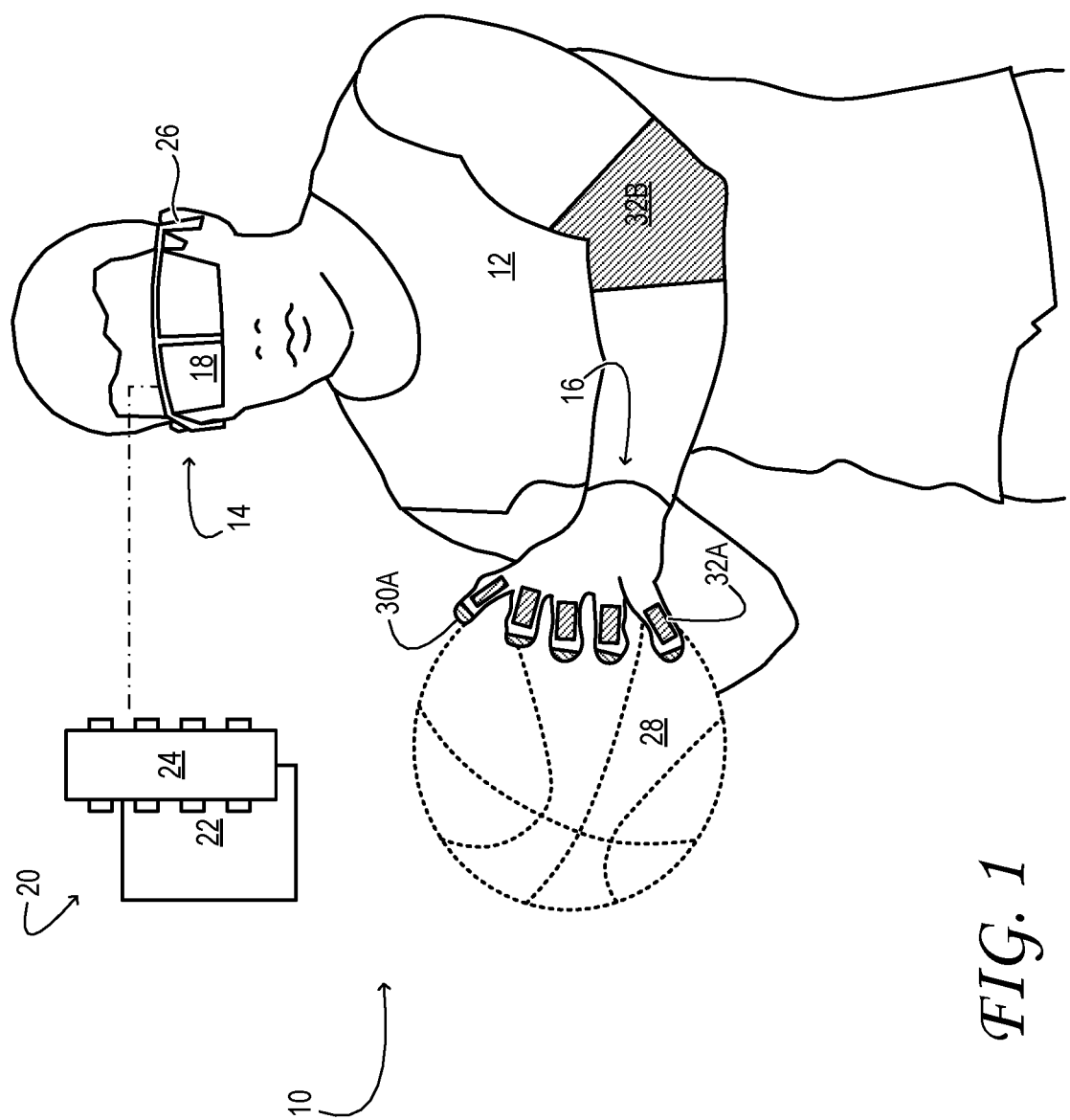
FIG. 1 shows aspects of an example display system including a body-movement restriction device.

FIG. 1 shows aspects of an example display system 10 configured to present to a user 12 a lifelike virtual reality environment. The display system 10 as illustrated is used to support virtual reality game play, but may be used in numerous other scenarios as well. Display system 10 includes a headset 14 and a haptic device 16. The headset 14 includes a stereoscopic display 18 configured to display virtual imagery in the field of view of the user. In some examples, the stereoscopic display is see-through, enabling real-world and virtual imagery to be admixed in the user's field of view. This approach may be referred to as augmented or mixed reality. In headset 14, signal encoding the virtual display imagery is sent to the stereoscopic display via on-board computer 20. The on-board computer includes at least one processor 22 and associated electronic memory 24.

Leveraging communications componentry arranged in headset 14, on-board computer 20 may be coupled communicatively to one or more off-board computers on a network. Thus, the virtual display imagery that user 12 sees may, in some examples, be composed and/or rendered by an off-board computer. In other examples, the virtual display imagery may be composed and rendered on-board.

Headset 14 includes stereophonic loudspeakers 26 that enable user 12 to experience immersive VR audio. Haptic device 16 of display system 10 is configured to further augment the immersive experience by providing lifelike contact sensation responsive to user interaction with the virtual environment. In particular, the haptic device may be configured to provide a mechanical resistive contact sensation in response to detection of contact between the body of the user and a virtual display object projected into a field of view of the user. For instance, the mechanical resistive contact sensation may be provided whenever the hand of user 12 intersects virtual display object 28.

For example, haptic device 16 may optionally include a skin-pressure simulation portion 30A. The skin-pressure simulation portion is a component of the haptic device configured to apply touch-simulating pressure to the user's skin in the vicinity of contact with a virtual display object. The skin-pressure simulation portion may include an actuator configured to apply pressure in a direction normal to the surface of the skin. The skin-pressure simulation portion may include a piezoelectric or voice-coil type actuator, for example. In order to determine when to apply the pressure, the skin-pressure simulation portion is communicatively coupled to one or more computers of display system 10, such as on-board computer 20 of headset 14. More specifically, the computer hosts a model of the virtual environment and also tracks the position of the user's hand with the real-world coordinates of that model. When contact between the hand and a solid virtual object is indicated, the actuator is energized and pressure is applied to the skin. The actuator is de-energized when contact is no longer indicated. Accordingly, the skin-pressure simulation portion may be configured to give a static, rather than a dynamic actuation.

Although skin-pressure simulation portion 30A may simulate the sensation of the touch of a virtual object on the user's skin, this aspect alone may not provide a satisfactory contact sensation, as it would not offer a resistive effect of object contact on the user's skeletal joints. Contact with an actual solid object, by comparison, would result in the sensation of kinematic resistance to attempted movement through the object, which would be felt at the joints. For example, the joints of the fingers, in attempting to move the fingers through a solid object, would experience at least some reactive force from the object, with reference to Newton's third law.

To simulate this sensation, haptic device 16 includes at least one body-movement restriction portion 32 in the form of an electrostatic slide clutch. In the example shown in FIG. 1, a first body-movement restriction portion 32A is arranged in a glove worn on the hand of user 12, and a second body-movement restriction portion 32B is arranged in a sleeve worn around the arm. A sleeve supporting a body-movement restriction portion may be worn alternatively or additionally on the leg or other body part. Body-movement restriction portion 32 may be used either with or without skin-pressure simulation portion 30 in various implementations.

Figure 2:
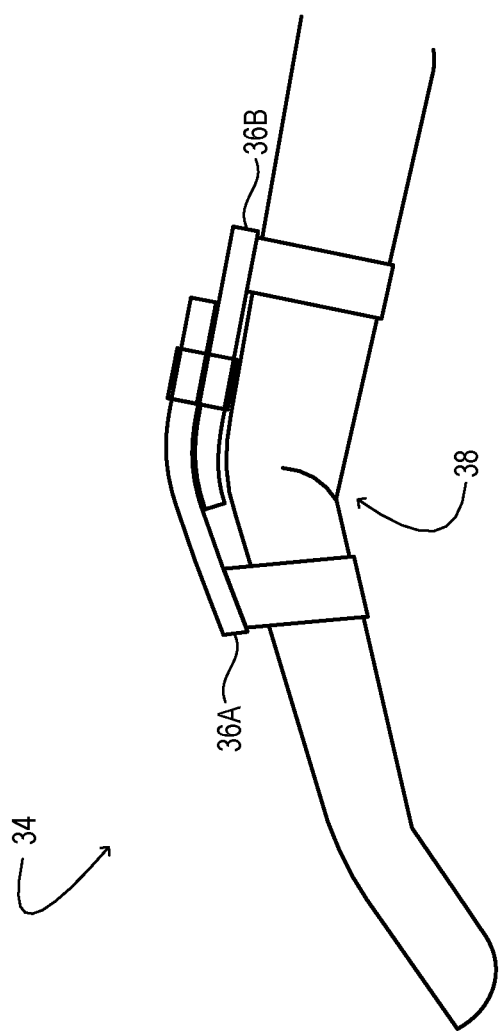
FIGS. 2 and 3 show aspects of an example electrostatic slide clutch of a body-movement restriction device.

FIG. 2 shows aspects of electrostatic slide clutch 34 of body-movement restriction portion 32A. In general, the electrostatic slide clutch is configured to vary the sliding and/or static frictional force between two substrates 36 movable translationally with respect to each other. In the example of FIG. 2, first substrate 36A is coupled to the skin on a first side of a skeletomuscular joint 38, and second substrate 36B is coupled on a second, opposite side of the skeletomuscular joint.

Configurations differing from that of FIG. 2 are also envisaged. In one example, the body-movement restriction portion may take the form of a tube around the finger that becomes stiffer to restrict movement. In yet another example, substrates may be arranged as overlapping scales on a medieval armor glove.

Figure 3:
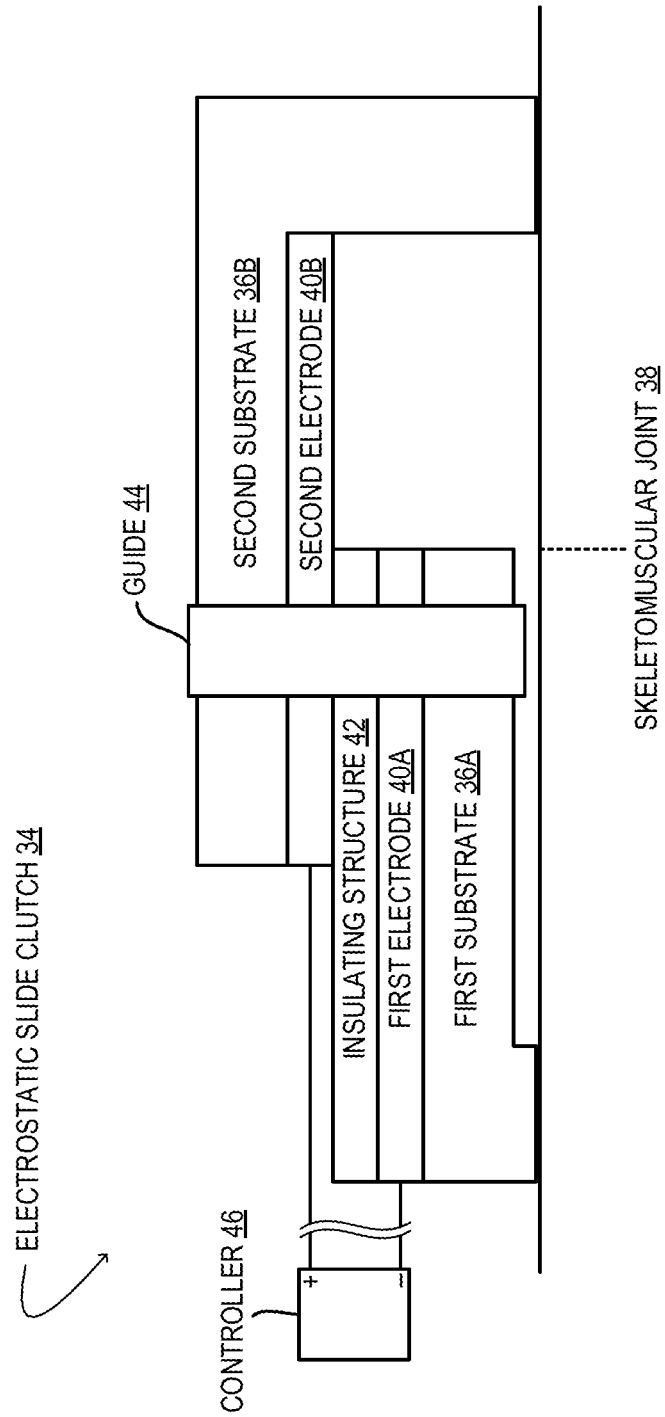

FIG. 3 shows additional aspects of electrostatic slide clutch 34. The electrostatic slide clutch includes a first electrode 40A and a second electrode 40B oriented parallel to the first electrode. In FIG. 3, the first electrode is formed on or bonded to a first substrate 36A and the second electrode is formed on or bonded to a second substrate 36B. Each of the first and second substrates is secured to the skin of the user, or otherwise closely coupled to an articulable region of the body. More generally, one or both of the first and second electrodes may be formed on or bonded to a substrate, and one or both of the substrates may be secured to the skin. In other examples, an electrode may be applied directly to the skin, such that no distinct substrate is required for that electrode.

In some examples, one or both of first electrode 40A and second electrode 40B includes an electrically conductive continuous or discontinuous (e.g., patterned) film applied to an underlying substrate using solution-process methods. Examples of electrically conductive films include ink-jet, screen-printed, gravure printed, or flexographic-printed films. Other examples include slot-die coatings and spin coatings of conductive films. Graphite, silver, or gold films, for example, may be applied. In other examples, a metal-film electrode may be formed by vacuum deposition methods such as physical vapor deposition (PVD) one or more metals, such as aluminum or copper, etc. onto a substrate. Chemical vapor deposition, electroless plating, electroplating, atomic-layer deposition, and/or other forms of material deposition may also be used. Suitable electrode substrates may be rigid or flexible, depending on the detailed configuration of electrostatic slide clutch 34.

In some examples, one or both of the first and second electrodes 40 may be flexible. A flexible electrode may be formed from a woven or non-woven conductive fabric, for example. In some examples, one or both of the first and second electrodes may have relatively high sheet resistance, as very little current is drawn through the electrodes during operation of electrostatic slide clutch 34 (vide infra).

Continuing in FIG. 3, an electrically insulating structure 42 is disposed on first electrode 40A on a face of the first electrode opposing the second electrode 40B. In the illustrated example, the electrically insulating structure is arranged in slidable contact with the second electrode. In other examples, electrostatic slide clutch 34 further comprises a second insulating sheet disposed on the second electrode on a face of the second electrode opposing the first electrode. There, the first and second insulating sheets may be arranged in slidable contact with each other.

Electrostatic slide clutch 34 includes a slide guide 44 configured to guide relative sliding motion of the first and second electrodes. The slide guide may include a slot for one or both of the first and second electrodes. In the example of FIG. 3, the slide guide is fixedly coupled to first electrode 40A and includes a slot for second electrode 40B and the associated substrate. More generally, the slide guide may be fixedly coupled to either of the first and second electrodes or to a substrate thereof.

Electrostatic slide clutch 34 includes a controller 46 electrically coupled to first electrode 40A and to second electrode 40B and configured to apply a variable voltage between the first and second electrodes, to influence a normal force between the first and second electrodes. Positive voltage may be applied to the first electrode relative to the second electrode, or vice versa. In some examples, an alternating voltage of suitable frequency may be used, to facilitate dynamically changing the force applied during sliding operation.

Applying voltage of either polarity causes an amount of unbalanced charge to form on the opposing surfaces of electrodes 40, which draws the electrodes together via the Coulomb force. In the illustrated example, the Coulomb force is balanced by a reactive (i.e., third law) normal force between electrically insulating structure 42 and second electrode 40B. Increasing normal force brings about a corresponding increase in both static and sliding friction forces between the electrically insulating structure and the second electrode.

In some examples, the material properties of electrically insulating structure 42 may be selected for suitable resistance to sliding wear and to provide a suitably high coefficient of static and/or sliding friction, so that an increase in the normal force between the electrically insulating structure and second electrode 40B restricts the relative sliding motion of the first and second electrodes. This action may cause, in some scenarios, adhesion between the two surfaces.

To ensure that electrostatic slide clutch 34 imparts resistive force at the appropriate time, controller 46 is communicatively coupled to one or more computers of display system 10, such as on-board computer 20 of headset 14. Contact between the user's body and virtual objects in the virtual or mixed reality environment is determined with reference to the virtual environmental model hosted by the computer and to tracked body positions.

Counterforce to separate the electrodes and relieve the applied frictional force may be provided, for example, by a small deviation from planarity of the electrodes and associated substrates, which acts as a spring. In the example of FIG. 3, slide guide 44 accommodates only one pair of opposing first and second electrodes. In other examples, the slide guide may accommodate a plurality of pairs of opposing first and second electrodes, to achieve increased frictional force for a given applied voltage.

Electrically insulating structure 42 may be of a thickness selected to achieve a suitably strong normal force at a given voltage, and thereby reduce the operating voltage for operation of electrostatic clutch 34. Both the electric field strength and the charge are inversely proportional to the distance between the electrodes, so the normal force is inversely proportional to the square of the distance and directly proportional to the surface area of overlap between the first and second electrodes. In some implementations, roughening, texturing, and/or shaping the electrodes over an appropriate length scale may amplify the effective overlap area.

In the examples envisaged herein, electrically insulating structure 42 includes a dielectric material. The dielectric material may be selected to exhibit a high dielectric strength in order to support a large electric field without suffering breakdown. Moreover, the dielectric material may exhibit a high dielectric constant, to maximize the normal force at a given voltage. Increasing the dielectric constant of the dielectric material increases proportionately the surface charge on first and second electrodes 40, resulting in a proportional increase in the normal force at a given voltage. In one example, a 10 μm thick electrically insulating poly (vinylidenefluoride-trifluoroethylene-chlorofluoroethylene)) (P(VDF-TrFE-CFE)) sheet provides adequate normal force with 150 volts applied between the first and second electrodes. In some examples, the dielectric material may exhibit a dielectric constant from 3 or above. In some examples, the dielectric material may exhibit a dielectric constant between 20 and 60.

In some examples, the dielectric material of electrically insulating structure 42 may be a homogeneous, sheet-forming material, such as a polymer of suitable dielectric constant and dielectric strength. In other examples, the electrically insulating structure may be a solid material composite (i.e., a mixture) comprising the dielectric material dispersed and immobilized within a polymer matrix. For example, the dielectric may include finely divided aluminum oxide dispersed in poly(vinylidenefluoride) (PVDF). Table 1 lists physical properties of various example dielectric materials.

TABLE 1

Dielectric Materials

| Material[a] | VD[c] | Static[b] | Sliding[b] | Dielectric Constant | Dielectric Strength[d] |
|---|---|---|---|---|---|
| PTFE | | 0.04 | | 2.1 | 500 |
| $Al_2O_3$/Sapphire | yes | 1.05-1.13 | 1.4 | 9.34 | 16 |
| $SiO_2$ | yes | | | 3.9 | |
| $Si_3N_4$ | yes | | | 7.5 | |
| Dragon Skin Medium | | | | 2.7-3 | 13 |
| P7670 | | | | 2.7-3 | 30-80 |
| Polyimide | | 0.63 | 0.48 | 3.4 | 303 |
| Polyurethane | | | | 7.1-30 | |
| PVC | | | | 3.5-8 | |
| PE | | | | 2.5 | |
| HTT C1 | yes | | | 20-25 | |
| HTT T1 | yes | | | 60 | 80 |
| SU8-2000 | no | | | 4.1 | |
| SU8-3000 | no | | | 3.2 | |
| Plexiglas | | | | 1.9 | |
| Pyrex | no | 0.9-1 | 0.4 | 4.7 | |
| Natural rubber | no | 1-4 | 0.5-1 | 2-2.5 | |
| $BaTiO_3$ | yes | | | 1200-10000 | |
| PET | | | | 2.9 | 50-100 |
| PFA | | | | 2.1 | |
| Parylene | yes | | | 2.5-2.67 | |
| $ZrO_2$ | yes | | | 10-23 | |
| $(Pb,La)(Zr,Ti)O_3$ (PLZT) | yes | | | 440 | |
| $Ta_2O_5$ | yes | | | 25 | |
| $TiO_2$ | yes | | | 80-170 | |

[a]Dragon Skin Medium is a product of Smooth-On, Inc. of Macungie, PA. P7670 is a product of Wacker Chemie AG of München, Germany; Kapton Mylar, Teonex, Tetoron, and HFF are products of Dupont of Wilmington, DE; HTT C1 and HTT T1 are products of Arkema of Colombes, France; SU8-2000 and SU8-3000 are products of Microchem Corp. of Westborough, MA.
[b]Coefficients of static and sliding friction.
[c]Yes indicates that the material is amenable to vapor deposition.
[d]Dielectric strength in units of volts per micrometer.

Electrically insulating structure 42 may be formed on or bonded to first electrode 40A in any suitable manner. In some examples, as noted above, first electrode 40A may include a conductive fabric. Here, the dielectric material of electrically insulating structure 42 may permeate the conductive fabric of the first electrode. In other examples, the electrically insulating structure may be blade-cast or spin-cast, for example, to a thickness of 1 μm, or deposited on the first electrode by vapor-phase deposition. Both physical vapor deposition and chemical vapor deposition are envisaged. Table 1 provides non-limiting examples of dielectric materials amenable to vapor-phase deposition.

In some examples, electrically insulating structure 42 may be subject to surface treatment. For example, a chemical surface treatment may be used to modify coefficients of static and/or sliding friction, or to increase the wear resistance or dielectric strength of the electrically insulating structure. Physical surface treatment such as mechanical abrasion may be used to roughen the electrically insulating structure to increase the frictional coefficients, or to prepare the sheet for chemical surface treatment, for example. Second electrode 40B may also be subject to chemical and physical surface treatment, for similar advantages.

Figure 5:
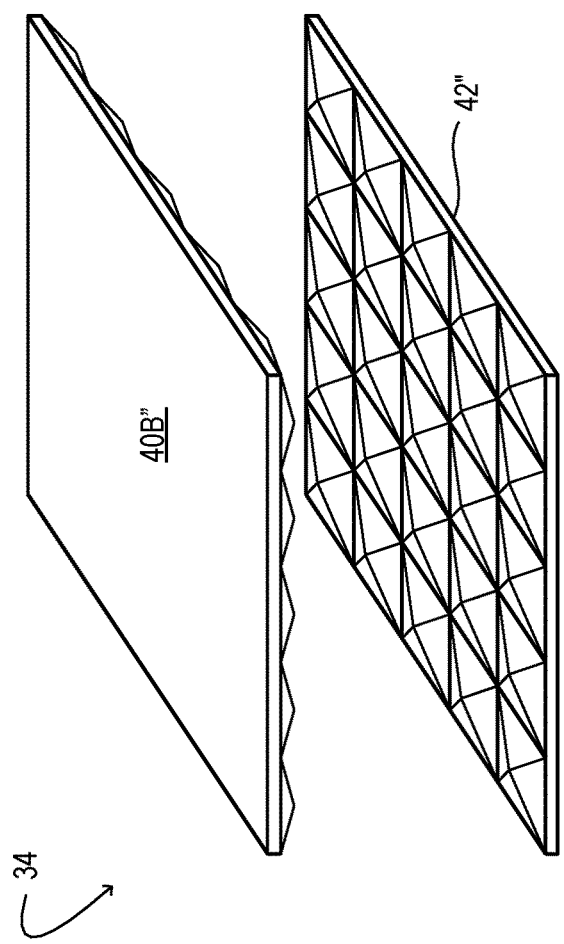
FIGS. 5 and 6 show aspects of other electrically insulating structures of an electrostatic slide clutch.
Figure 4:
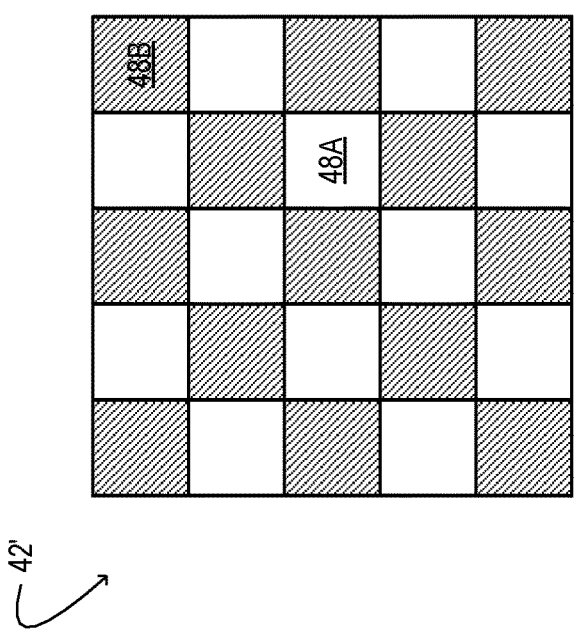
FIG. 4 shows aspects of an example electrically insulating structure of an electrostatic slide clutch.

In some examples, the electrically insulating structure may have a heterogeneous surface structure (which also may be referred to as a composite surface structure) having zones differing in one or more of dielectric composition, matrix composition, surface treatment and/or surface relief. The length scale of the heterogeneity (i.e., the size of the various zones) is not particularly limited; the length scale may differ from one embodiment to the next and may range from microns to tens of millimeters. In the example shown in FIG. 4, the heterogeneous surface structure of electrically insulating structure 42' includes a millimeter- to micrometer-scale pattern of such zones 48. As noted above, zones of other dimensions are also envisaged. The illustrated example shows a checkerboard pattern of alternating zones 48A and 48B, as a non-limiting example of a patterning of zones. This approach may facilitate fine-tuning of the dielectric constant and surface properties, such as the frictional coefficients. Strictly or substantially two-dimensional zone patterns may be used in some examples. In other examples, the zone pattern also may extend normal to the electrically insulating structure. One such example is shown in FIG. 5. Here, the pattern of zones of electrically insulating structure 42" includes surface features interlocking three-dimensionally with complementary surface features of second electrode 40B". This configuration increases the effective frictional forces between the first and second electrodes. In some examples, zone patterns may be formed on the electrically insulating structure 42" and/or second electrode 40B" via a micromolding or embossing procedure. In other examples, the zone patterns may be formed by lithography and/or etching. In the examples provided above, the heterogeneous surface structure of the electrically insulating structures is on the micrometer-to-millimeter scale.

Figure 6:
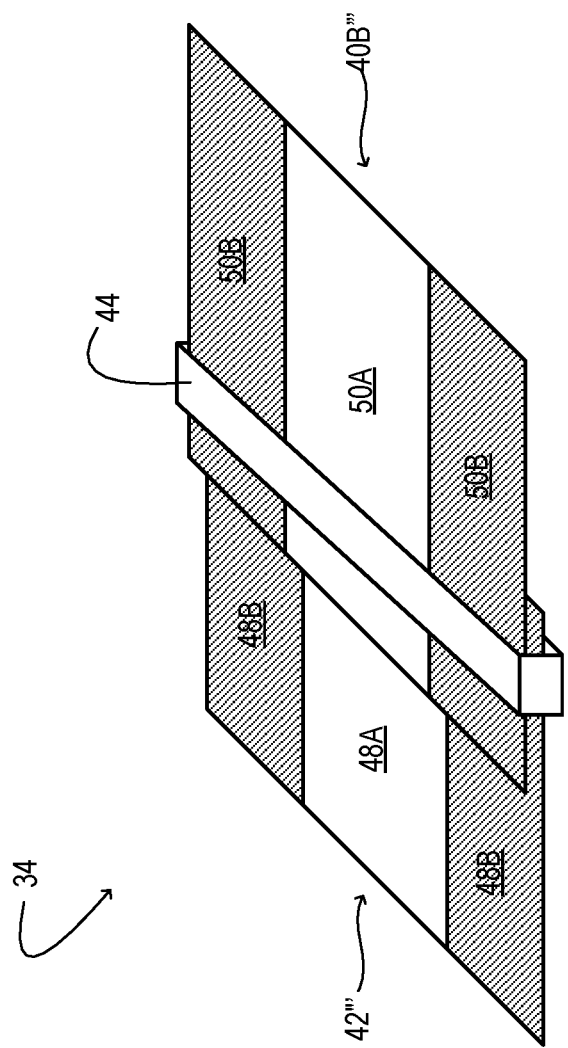

In some examples, a motion restricting apparatus may comprise a heterogeneous surface structure in the form of macroscopically separate frictional and dielectric surfaces. FIG. 6 shows an example of such a structure. Separating frictional surface 48B from dielectric surface 48A lessens wear on the dielectric surface with repeated actuation of electrostatic slide clutch 34. This approach also may facilitate subjecting the frictional and dielectric surfaces to different surface treatments. For example, the dielectric surface may be treated with a lubricant to lessen wear, while the frictional surface may remain unlubricated, in order to preserve the high frictional coefficients. In the illustrated example, second electrode 40B''' includes a low-friction zone 50A opposing the dielectric surface of the electrically insulating structure and a high-friction zone 50B opposing the frictional surface of the electrically insulating structure. In these and other examples, the first and second electrodes may be shaped so as to provide a region of overlap of a predetermined or changing geometry as the electrodes move against each other. For instance, non-rectangular electrodes may provide a changing area of overlap (and normal force, therefore) as one electrode slides over the other.

No aspect of the foregoing description should be understood in a limiting sense, for numerous variations, extensions, and omissions are contemplated as well. In some configurations, for example, haptic device 16 may be non-wearable, but instead integrated into a control, such as a dial. The electrostatic slide clutch of the haptic device may provide variable resistance to the turning of the dial, or give the sensation of a series of detents, for example, pursuant to resistive applied via a controller 46.

In other examples, a body-movement restriction portion in the form of an electrostatic slide clutch may be used in medical, rather than virtual or mixed reality applications. Controllable body-movement restriction may be useful for the patient rehabilitating from a skeletomuscular injury such as back/knee injury, or brain injury such as stroke. In other examples, a body-movement restriction portion may be used as an active restraint for management of seizures or potentially dangerous body movements associated with autism, psychiatric disorders, or acute substance abuse.

A body-movement restriction portion in the form of an electrostatic slide clutch may also be amenable to various industrial-safety applications. In one example, machine vision or other environment-sensing componentry may be used to assess whether persons are in close proximity to potentially dangerous machinery. Persons wearing an appropriate body-movement restriction portion operatively coupled to the environment-sensing componentry may be protected from drawing too close to the machinery, extending a hand or finger into a cutting device, etc. In other examples, a body-movement restriction portion worn by a worker may be configured for skeletal strain mitigation. When the worker is carrying a heavy object, the body-movement restriction portion may lock into place, providing additional resistance to motion and relieving stress on the worker's fingers, wrists, arms, legs, and other skeletal joints.

In still other examples, an electrostatic slide clutch as described above may be used in a variety of electromechanical applications. The clutch may be used to provide positive braking for a servomechanical (e.g., a robotic, soft robotic, and/or ball-joint) actuator. Additionally, each of the electrostatic slide clutch examples described herein also may be used as a sensor, as the electric current drawn through the device at constant voltage bias is related to the rate of change of the area of overlap between the opposing electrodes, and of the portion of the overlap area occupied by the dielectric. As such, the structures described herein may be used both to provide a controllable resistance to motion and to provide sensor output regarding an extent of motion. In one example, measurement of the capacitance across the opposing electrodes may provide an indication of the extent of motion. More generally, the controller of the electrostatic slide clutch may be configured to provide an output responsive to an amount of charge provided to the first or second electrodes in response to relative motion of the first and second electrodes.

Another example provides an electrostatic slide clutch comprising: a first electrode; a second electrode oriented parallel to first electrode; an electrically insulating structure disposed on the first electrode on a face of the first electrode opposing the second electrode, the electrically insulating structure having a heterogeneous surface structure including a pattern of zones differing in one or more of dielectric composition, matrix composition, surface treatment, and surface relief; and a controller electrically coupled to the first electrode and to the second electrode and configured to apply a variable voltage between the first and second electrodes, to influence a normal force between the first and second electrodes.

In some implementations, the electrically insulating structure is a first electrically insulating structure, the electrostatic slide clutch further comprising a second insulating sheet disposed on the second electrode on a face of the second electrode opposing the first electrode, and wherein the first electrically insulating structure and second electrically insulating structures are arranged in slidable contact with each other. In some implementations, the electrically insulating structure includes a dielectric material. In some implementations, a dielectric constant of the dielectric material is between 20 and 60. In some implementations, the dielectric material is dispersed in a polymer matrix. In some implementations, the dielectric material includes aluminum oxide. In some implementations, the electrically insulating structure comprises a vapor-phase deposited film. In some implementations, the electrically insulating structure comprises a treated surface. In some implementations, the pattern of zones includes surface features interlocking three-dimensionally with complementary surface features of the first electrode, to increase an effective frictional force between the first and second electrodes. In some implementations, the heterogeneous surface structure includes macroscopically separate frictional and dielectric surfaces.

Another example provides a haptic device of a virtual reality system, the haptic device comprising: a body-movement restriction portion in the form of an electrostatic slide clutch, comprising: a first electrode disposed on a first substrate; a second electrode disposed on a second substrate, where each of the first and second substrates is closely coupled to an articulable region of the body; an electrically insulating structure disposed on the first electrode on a face of the first electrode opposing the second electrode; and a controller electrically coupled to the first electrode and to the second electrode and configured to apply a variable voltage between the first and second electrodes, to influence a normal force between the first and second electrodes.

In some implementations, the body-movement restriction portion is configured such that an increase in the normal force restricts the relative sliding motion. In some implementations, the electrically insulating structure is arranged in slidable contact with the second electrode. In some implementations, the electrically insulating structure includes a dielectric material, wherein the first electrode includes a conductive fabric, and wherein the dielectric material permeates the conductive fabric of the first electrode. In some implementations, one or both of the first and second electrodes is flexible. In some implementations, the heterogeneous surface structure of the electrically insulating structure includes a millimeter- to micrometer-scale pattern of surface features interlocking three-dimensionally with complementary surface features of the first electrode, to increase an effective frictional force between the first and second electrodes. Some implementations comprise a plurality of pairs of opposing first and second electrodes, to achieve increased frictional force for a given applied voltage. In some implementations, the electrostatic clutch is arranged in a glove or sleeve of the virtual reality system. In some implementations, the first substrate is coupled to the skin on a first side of a skeletomuscular joint of the user, and the second substrate is coupled to the skin on a second, opposite side of the skeletomuscular joint.

Another example provides a virtual reality system comprising: a body-movement restriction portion in the form of an electrostatic slide clutch, comprising: a first electrode disposed on a first substrate; a second electrode oriented parallel to first electrode, the second electrode disposed on a second substrate, where each of the first and second substrates is closely coupled to an articulable region of the body; an electrically insulating structure disposed on the first electrode on a face of the first electrode opposing the second electrode; and a controller electrically coupled to the first electrode and to the second electrode and configured to apply a variable voltage between the first and second electrodes, to influence a normal force between the first and second electrodes in response to detection of contact between the body of the user and a virtual display object projected into a field of view of the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electrostatic slide clutch comprising:
a first electrode;
a second electrode oriented parallel to the first electrode;
an electrically insulating structure disposed on a face of the first electrode opposing the second electrode, the electrically insulating structure having a heterogeneous surface structure including separate frictional and dielectric surfaces, and the heterogeneous surface structure including a pattern of zones differing in one or more of dielectric composition, matrix composition, surface treatment, and surface relief; and
a controller electrically coupled to the first electrode and to the second electrode and configured to apply a variable voltage between the first and second electrodes, to influence a normal force between the first and second electrodes, wherein the controller is further configured to sense a relative motion of the first electrode and the second electrode.

2. The electrostatic slide clutch of claim 1 wherein the electrically insulating structure is a first electrically insulating structure, the electrostatic slide clutch further comprising a second electrically insulating structure disposed on the second electrode on a face of the second electrode opposing the first electrode, and wherein the first electrically insulating structure and the second electrically insulating structure are arranged in slidable contact with each other.

3. The electrostatic slide clutch of claim 1 wherein the electrically insulating structure comprises a sheet.

4. The electrostatic slide clutch of claim 3 wherein the electrically insulating structure comprises a dielectric material that is dispersed in a polymer matrix.

5. The electrostatic slide clutch of claim 4 wherein the dielectric material includes aluminum oxide.

6. The electrostatic slide clutch of claim 1 wherein the electrically insulating structure comprises a vapor-phase deposited film.

7. The electrostatic slide clutch of claim 1 wherein the electrically insulating structure comprises a treated surface.

8. The electrostatic slide clutch of claim 1 wherein the pattern of zones includes surface features interlocking three-dimensionally with complementary surface features of the first electrode, to increase an effective frictional force between the first and second electrodes.

9. The electrostatic slide clutch of claim 1 wherein the frictional and the dielectric surfaces are macroscopically separate.

10. A haptic device of a virtual reality system, the haptic device comprising:
a body-movement restriction portion in the form of an electrostatic slide clutch, comprising:
a first electrode disposed on a first substrate;
a second electrode disposed on a second substrate, where each of the first and second substrates is closely coupled to an articulable region of a body of a user;
an electrically insulating structure disposed on the first electrode on a face of the first electrode opposing the second electrode, the electrically insulating structure having a heterogeneous surface structure including separate frictional and dielectric surfaces, and the heterogeneous surface structure including a pattern of zones differing in one or more of dielectric composition, matrix composition, surface treatment, and surface relief; and
a controller electrically coupled to the first electrode and to the second electrode and configured to apply a variable voltage between the first and second electrodes, to influence a normal force between the first and second electrodes, the heterogeneous surface structure being configured to increase a frictional force between the first and second electrodes when the controller applies the variable voltage between the first and second electrodes.

11. The haptic device of claim 1 wherein the body-movement restriction portion is configured such that an increase in the normal force restricts a relative sliding motion of the first electrode and the second electrode.

12. The haptic device of claim 1 wherein the electrically insulating structure is arranged in slidable contact with the second electrode.

13. The haptic device of claim 1 wherein the electrically insulating structure includes a dielectric material, wherein the first electrode includes a conductive fabric, and wherein the dielectric material permeates the conductive fabric of the first electrode.

14. The haptic device of claim 1 wherein one or both of the first and second electrodes is flexible.

15. The haptic device of claim 1 wherein the heterogeneous surface structure of the electrically insulating structure includes a millimeter- to micrometer-scale pattern of surface features interlocking three-dimensionally with complementary surface features of the first electrode, to increase an effective frictional force between the first and second electrodes.

16. The haptic device of claim 15 further comprising a plurality of pairs of opposing first and second electrodes, to achieve increased frictional force for a given applied voltage.

17. The haptic device of claim 15 wherein the electrostatic clutch is arranged in a glove or sleeve of the virtual reality system.

18. The haptic device of claim 15 wherein the first substrate is coupled to the user's skin on a first side of a skeletomuscular joint of the user, and the second substrate is coupled to the skin on a second, opposite side of the skeletomuscular joint.

19. The haptic device of claim 1, wherein the controller is further configured to sense a relative motion of the first and second electrodes.

20. A virtual reality system comprising:
 a body-movement restriction portion in the form of an electrostatic slide clutch, comprising:
  a first electrode disposed on a first substrate;
  a second electrode oriented parallel to first electrode, the second electrode disposed on a second substrate, where each of the first and second substrates is closely coupled to an articulable region of a body of a user;
 an electrically insulating structure disposed on the first electrode on a face of the first electrode opposing the second electrode, the electrically insulating structure having a heterogeneous surface structure including separate frictional and dielectric surfaces, and the heterogeneous surface structure including a pattern of zones differing in one or more of dielectric composition, matrix composition, surface treatment, and surface relief; and
 a controller electrically coupled to the first electrode and to the second electrode and configured to apply a variable voltage between the first and second electrodes, to influence a normal force between the first and second electrodes in response to detection of contact between the body of the user and a virtual display object projected into a field of view of the user, the heterogeneous surface structure being configured to increase a frictional force between the first and second electrodes when the controller applies the variable voltage between the first and second electrodes.

* * * * *